(12) United States Patent
Kato

(10) Patent No.: US 12,425,733 B2
(45) Date of Patent: Sep. 23, 2025

(54) IMAGING CONTROL APPARATUS, IMAGE PICKUP APPARATUS, IMAGING CONTROL METHOD, AND STORAGE MEDIUM

(71) Applicant: CANON KABUSHIKI KAISHA, Tokyo (JP)

(72) Inventor: Fumihiko Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 18/458,850

(22) Filed: Aug. 30, 2023

(65) Prior Publication Data
US 2024/0073525 A1 Feb. 29, 2024

(30) Foreign Application Priority Data
Aug. 31, 2022 (JP) ................. 2022-137841

(51) Int. Cl.
*H04N 23/68* (2023.01)
*H04N 23/611* (2023.01)
*H04N 23/667* (2023.01)
*H04N 23/69* (2023.01)
*H04N 23/695* (2023.01)

(52) U.S. Cl.
CPC ......... *H04N 23/685* (2023.01); *H04N 23/611* (2023.01); *H04N 23/667* (2023.01); *H04N 23/69* (2023.01); *H04N 23/695* (2023.01)

(58) Field of Classification Search
CPC .. H04N 23/685; H04N 23/611; H04N 23/667; H04N 23/69; H04N 23/695
USPC .......................................................... 348/169
See application file for complete search history.

(56) References Cited

U.S. PATENT DOCUMENTS

| | | | |
|---|---|---|---|
| 2016/0241793 A1* | 8/2016 | Ravirala | H04N 23/635 |
| 2017/0302719 A1* | 10/2017 | Chen | H04L 65/61 |
| 2020/0099896 A1* | 3/2020 | Galvin | G01D 3/022 |
| 2021/0058557 A1* | 2/2021 | Koga | H04N 23/62 |

FOREIGN PATENT DOCUMENTS

| | | |
|---|---|---|
| JP | 2007158860 A | 6/2007 |
| JP | 2014236255 A | 12/2014 |
| JP | 2021034824 A | 3/2021 |

* cited by examiner

*Primary Examiner* — Christopher S Kelley
*Assistant Examiner* — Asmamaw G Tarko
(74) *Attorney, Agent, or Firm* — Canon U.S.A., Inc. IP Division

(57) ABSTRACT

An imaging control apparatus includes a memory storing instructions, and a processor configured to execute the instructions to acquire a streaming status of image data generated by an image pickup apparatus, and control zoom of the image pickup apparatus by changing a zoom value according to the streaming status.

15 Claims, 12 Drawing Sheets

IMAGING CONTROL APPARATUS, IMAGE PICKUP APPARATUS, IMAGING CONTROL METHOD, AND STORAGE MEDIUM

BACKGROUND

Technical Field

One of the aspects of the embodiments relates to an imaging control technology for an image (video) streaming system that streams image (video) data generated by an image pickup apparatus (camera).

Description of Related Art

Such an image streaming system may use an automatic tracking technology that controls a camera to automatically track a specific object detected by artificial intelligence (AI). The user can switch between images from the camera that automatically tracks the object with a switcher and stream them. At this time, since images from the camera during streaming are viewed by viewers, the camera control is demanded not to degrade the image quality.

Japanese Patent Laid-Open 2021-34824 discloses a camera control that causes a camera to acquire an image used status from a switcher, and prevents the image quality from deteriorating during streaming in a case where images from the camera are streamed, by limiting pan and tilt driving speeds.

On the other hand, in an image streaming system that uses the automatic tracking technology, during non-streaming of images, the camera is demanded to prevent the image quality from deteriorating and to smoothly continue automatic tracking.

SUMMARY

An imaging control apparatus according to one aspect of the embodiment includes a memory storing instructions, and a processor configured to execute the instructions to acquire a streaming status of image data generated by an image pickup apparatus, control zoom of the image pickup apparatus by changing a zoom value according to the streaming status. An imaging control apparatus according to another aspect of the embodiment includes a memory storing instructions, and a processor configured to execute the instructions to acquire a streaming status of image data generated by an image pickup apparatus, detect an object from the image data, control an imaging direction of the image pickup apparatus according to the detected position of the object by changing a parameter for controlling the imaging direction according to the streaming status.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

First Embodiment

Configuration of Image Streaming System 10

Figure 1:
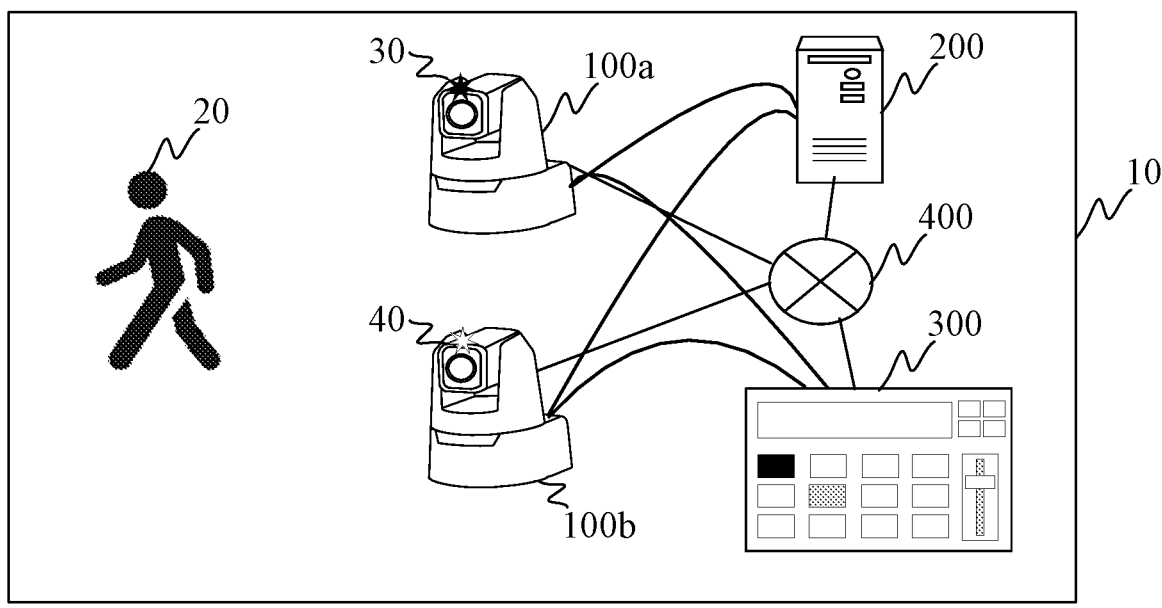
FIG. 1 illustrates an overview of an image streaming system according to a first embodiment.

FIG. 1 illustrates an image streaming system according to a first embodiment. The image streaming system 10 includes cameras 100 (100a, 100b) as a plurality of image pickup apparatuses for respectively capturing scenes including an object 20, a workstation 200, and a switcher 300. The cameras 100 and workstation 200 are connected via a network 400 so that they can communicate with each other.

Any connection type or communication protocol may be used. Alternatively, the cameras 100 and workstation 200 may be directly connected using a communication cable without the network 400. The number of cameras 100 may be three or more.

The workstation 200 as an imaging control apparatus controls an operation of each camera 100 by transmitting an image request command requesting transmission of an image stream as image data to each camera 100 via the network 400 (or communication cable) and a setting command instructing the setting of various parameters. Each camera 100 transmits an image stream to the workstation 200 via an image cable (or network 400) according to an image request command, and stores various parameters according to the setting command. The workstation 200 transmits pan, tilt, and zoom control commands to each camera 100 via the network 400 (or communication cable), and controls the orientations and sizes of the imaging angle of view of each camera 100 in the pan and tilt directions.

A plurality of image input units in the plurality of cameras 100 and the switcher 300 are connected by image cables, respectively, and the image stream output by each camera 100 is input to the switcher 300. The switcher 300 selects an image stream (referred to as "streamed image" hereinafter) to an unillustrated external device for viewing from an image stream from a plurality of cameras 100, and an image stream (referred to as "preview image" hereinafter) to be streamed to the external device after the streamed image. Each camera 100 and switcher 300 are connected via the network 400 so that they can communicate with each other. Any connection type or communication protocol may be used. Alternatively, each camera 100 and the switcher 300 may be directly connected using a communication cable without the network 400.

The switcher 300 can transmit to a plurality of cameras 100 a selection command for notifying a camera for acquiring a streamed image (referred to as a streaming camera hereinafter) or a camera for acquiring a preview image (referred to as a preview camera hereinafter) that they have been selected. A camera that receives a selection command indicating a streaming camera turns on a streaming lamp 30, and a camera that receives a selection command indicating a preview camera turns on a lamp 40 during preview. The switcher 300 can transmit a selection command that notifies a camera (referred to as a standby camera hereinafter) for acquiring an image stream (referred to as a standby image hereinafter) that is not a streamed image or a preview image among the plurality of cameras 100 that it has been selected as a standby camera. The standby image is an image that is neither a streamed image nor a preview image. The standby image can be changed to the streamed image. A camera that has received a selection command indicating a standby camera can turn off the streaming lamp 30 and the preview lamp 40.

An image streaming status in this embodiment represents which of the plurality of cameras 100 is selected as a streaming camera, a preview camera, and a standby camera, that is, image data from which camera is selected as a streamed image, a preview image, and a standby image. The image streaming status can also be rephrased as a use status of image data. A state in which an image is selected (used) as a streamed image corresponds to the streaming state, and a state in which an image is selected as a standby image (waiting to be streamed) corresponds to the standby state. A state in which an image is selected as a preview image (which can become the streaming state earlier than the standby state) corresponds to the preview state.

The workstation 200 can acquire information indicating the current image streaming status of each camera (referred to as streaming status information hereinafter) by transmitting a command to inquire about the current image streaming status to the plurality of cameras 100.

Figure 2:
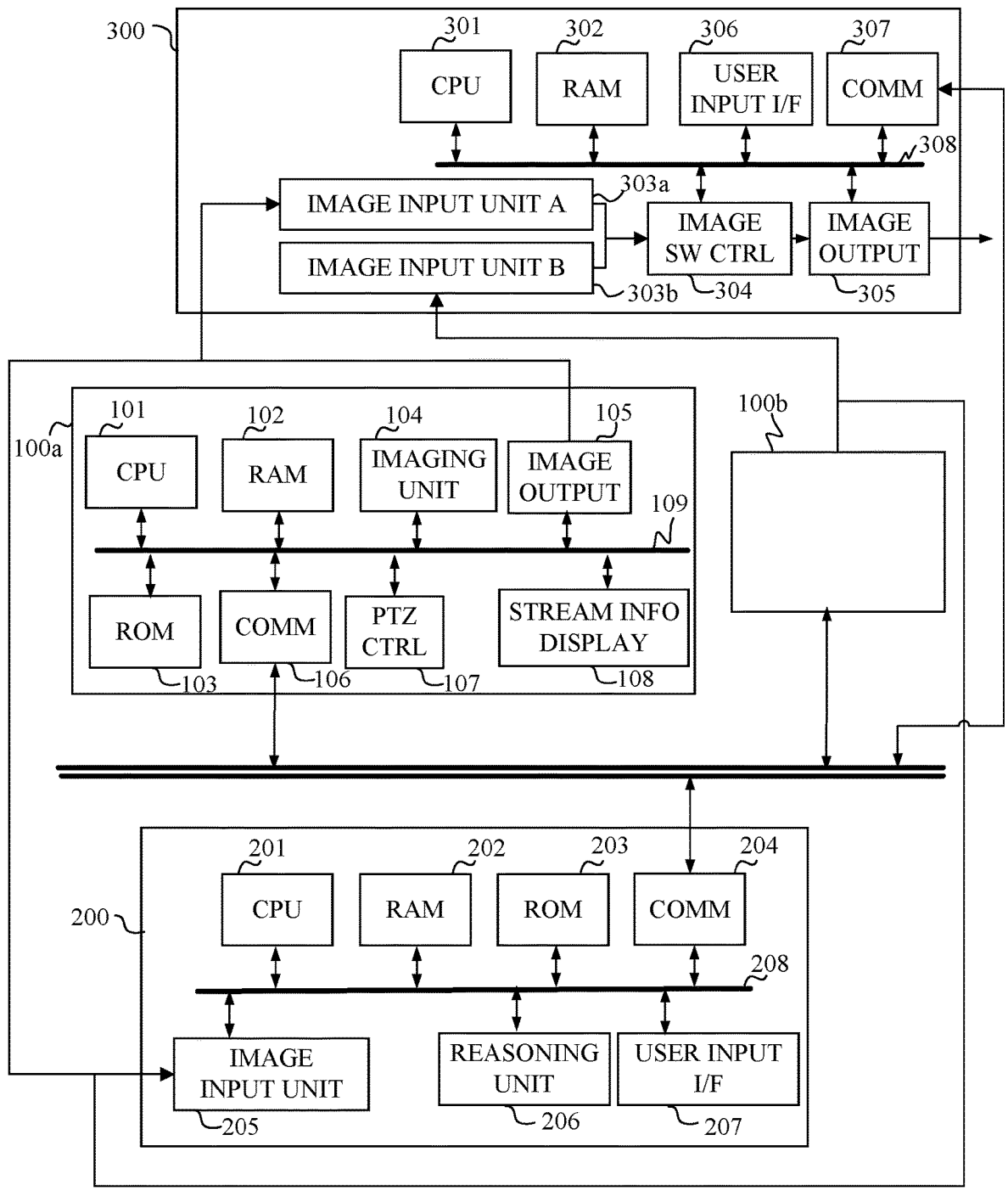
FIG. 2 is a block diagram illustrating a configuration of the image streaming system according to the first embodiment.

FIG. 2 illustrates configurations of each camera 100, workstation 200, and switcher 300 in the image streaming system according to this embodiment.

Configuration of Camera 100

Each camera 100 includes a CPU 101, a RAM 102, a ROM 103, an imaging unit 104, an image output unit 105, a communication unit 106, a Panoramic Tilt Zoom (PTZ) control unit 107, and a streaming status display unit 108, which are interconnected via an internal bus 109.

The CPU 101 controls the overall operation of each camera 100. The RAM 102 temporarily stores control programs and data as a work memory. The ROM 103 stores control programs executed by the CPU 101. The imaging unit 104 photoelectrically converts an optical image formed by the optical system using an image sensor, and generates image data from an output signal from the image sensor. The image sensor includes a photoelectric conversion element such as a Complementary Metal Oxide Semiconductor (CMOS) sensor or a Charge Coupled Device (CCD) sensor.

The image output unit 105 is an interface for outputting the image data generated by the imaging unit 104 to the outside, and includes Serial Digital Interface (SDI), High-Definition Multimedia Interface (HDMI) (registered trademark, or the like. The communication unit 106 performs network communication with an external device. In this embodiment, the communication unit 106 communicates with the workstation 200 and switcher 300.

The PTZ control unit 107 includes a zoom driving unit configured to drive the optical system of the imaging unit 104 to change an imaging angle of view, and a pan/tilt driving unit configured to pan and tilt the imaging unit 104 to change an orientation of the imaging angle of view (imaging direction). This embodiment performs optical zooming by driving the optical system of the imaging unit 104, but electronic zooming for enlarging and reducing image data may be performed.

The streaming status display unit 108 includes the streaming lamp 30 and the preview lamp 40 illustrated in FIG. 1. In a case where the CPU 101 receives a selection command from the switcher 300 via the communication unit 106 indicating that a streaming camera or a preview camera has been selected, the CPU 101 instructs the streaming status display unit 108 to turn on the corresponding lamp. For example, in a case where it is selected as a streaming camera, the streaming lamp 30 is lit in red, and in a case where it is selected as a preview camera, the preview lamp 40 is lit in green. Upon receiving a selection command indicating that the standby camera has been selected, the CPU 101 instructs the streaming status display unit 108 to turn off the streaming lamp 30 and the preview lamp 40. The CPU 101 stores the received selection command in the RAM 102 as the current selection command, and stores the last selection command received and stored in the RAM 102 as the last command.

Configuration of Workstation 200

The workstation 200 includes a CPU 201, a RAM 202, a ROM 203, a communication unit 204, an image input unit 205, a reasoning unit 206, and a user input I/F 207, which are interconnected via an internal bus 208.

The CPU 201 as an acquiring unit and a control unit controls the overall operation of the workstation 200. The RAM 202 as a work memory temporarily stores control programs and data. The ROM 203 is a nonvolatile memory represented by a flash memory, HDD, SSD, SD card, etc., and is used as a permanent memory area for the OS, various programs, and various data and as a short-term memory area for various data.

The communication unit 204 performs network communication with external devices. In this embodiment, the communication unit 204 communicates with each camera 100. The image input unit 205 is an interface for receiving image data from each camera 100, and includes SDI or HDMI.

The reasoning unit 206 as a detector includes a Graphics Processing Unit (GPU), Field-Programmable Gate Array (FPGA), etc., and reasons (estimates or detects) the presence or absence, and position of a specific object from the image data received from the image input unit 205. The reasoning processing performed by the reasoning unit 206 may be performed by the CPU 201.

The user input I/F 207 is an interface such as a USB (Universal Serial Bus) to which input devices such as a mouse, keyboard, and touch panel are connected, and transmits an instruction corresponding to a user operation on the input device to the CPU 201.

Configuration of Switcher 300

The switcher 300 includes a CPU 301, a RAM 302, an image input unit 303, an image switch control unit 304, an image output unit 305, a user input I/F 306, and a communication unit 307, which are interconnected via an internal bus 308.

The CPU 301 controls the overall operation of the switcher 300. The RAM 302 as a work memory temporarily stores control programs and data.

The image input unit 303 (A 303a, B 303b) is an interface for receiving image data from the camera 100, and includes SDI or HDMI. The image input unit A 303a receives image data from the camera 100a, and the image input unit B 303b receives image data from the camera 100b. The number of image input units 303 may correspond to the number of cameras 100, and may be three or more.

The image switch control unit 304 outputs image data from a plurality of image data input to the image input unit 303, selected by the user input I/F 306, which will be described below, to the image output unit 305, which will be described below.

The image output unit 305 is an interface for outputting image data to an unillustrated live stream device or a program recorder and includes SDI or HDMI.

The user input I/F 306 is an interface for accepting a user operation on the switcher 300, and includes a button, a dial, a joystick, a touch panel, and the like. The CPU 301 selects image data to be used for a streamed image and image data to be used for a preview image among the image data from the camera 100 input to the image input unit 303 in accordance with the operation of the user for switching the image streaming status through the user input I/F 306. Then, the CPU 301 instructs the image switch control unit 304 to switch image data to be output according to the selection result.

For example, in a case where image data input to the image input unit A 303a is selected as a streamed image and image data input to the image input unit B 303b is selected as a preview image, and an operation is performed to switch between them, the CPU 301 performs the following operations. First, the CPU 301 transmits to the camera 100a via the communication unit 307 a selection command for notifying the camera 100a connected to the image input unit A 303a that the camera 100a has been selected as a preview camera (image data from the camera 100a has been selected as a preview image). In addition, the CPU 301 transmits to the camera 100b via the communication unit 307 a selection command for notifying the camera 100b connected to the image input unit 303b that the camera 100b has been selected as a streaming camera (image data from the camera 100b has been selected as a streamed image). Next, the CPU 301 stores in the RAM 302 data indicating a post-switching image streaming status, in which the image data from the camera 100a is used as the preview image and the image data from the camera 100b is used as the streamed image.

Object Tracking Processing

Figure 3:
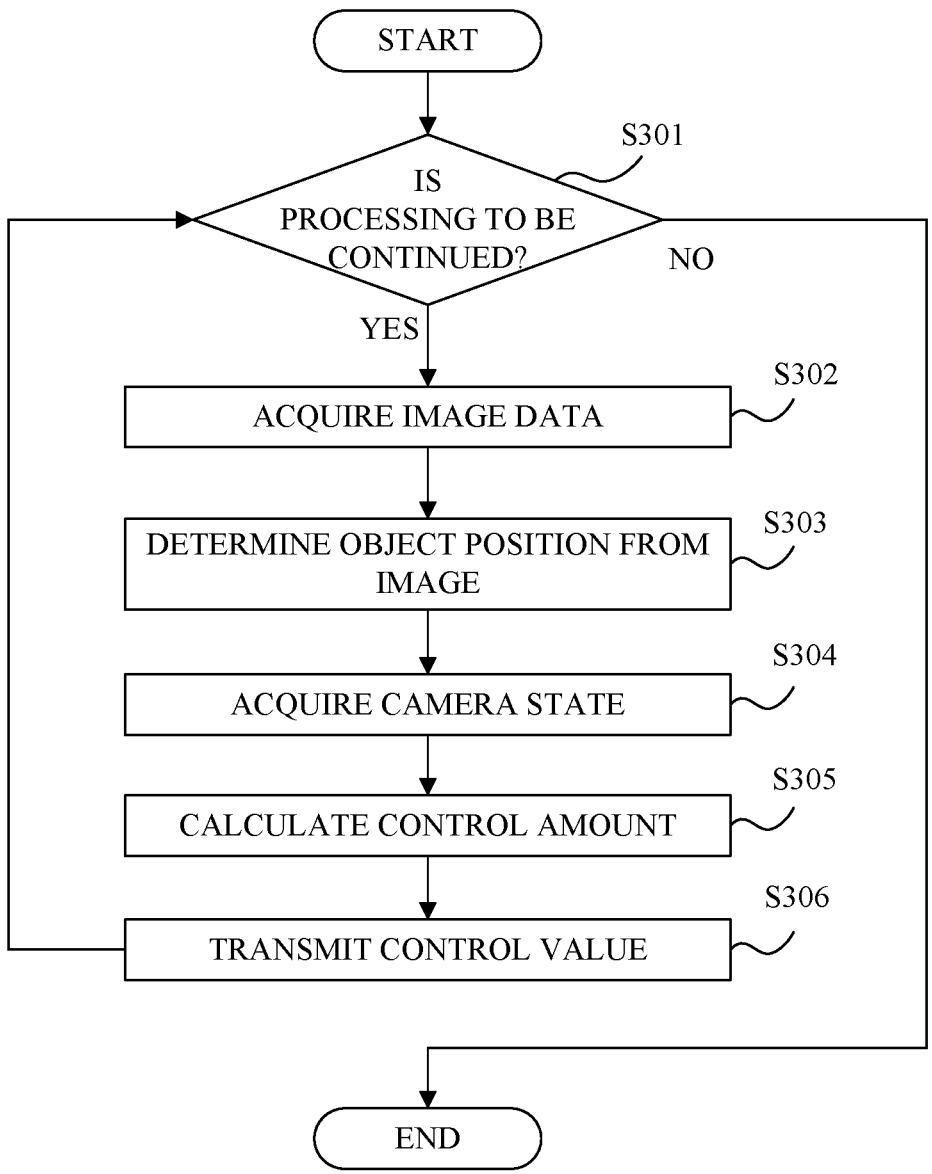
FIG. 3 is a flowchart illustrating object tracking processing of a workstation according to the first embodiment.
Figure 4:
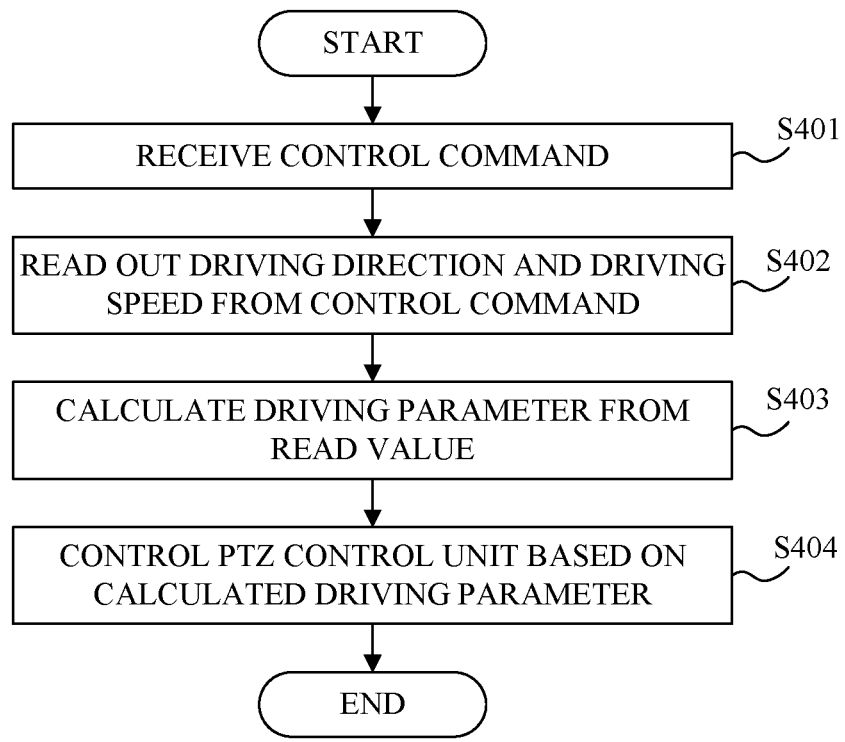
FIG. 4 is a flowchart illustrating object tracking processing of a camera according to the first embodiment.

A description will now be given of processing for controlling the camera 100 to track the object detected by the workstation 200 from the image data from the camera 100. A flowchart in FIG. 3 illustrates object tracking processing executed by the CPU 201 in the workstation 200 according to the control program. A flowchart in FIG. 4 illustrates object tracking processing executed by the CPU 101 in the camera 100 according to the control program. S in FIGS. 3 and 4 stands for the step.

The CPU 201 in the workstation 200 starts the processing in FIG. 3 by receiving an object tracking instruction via the communication unit 204 or the user input I/F 207.

In S301, the CPU 201 confirms whether or not the CPU 201 has received an instruction indicating the end of this processing, via the communication unit 204 or the user input I/F 207 (whether or not the processing is to be continued). In a case where the CPU 201 has not yet received the instruction, the flow proceeds to S302; otherwise, the flow ends.

In S302, the CPU 201 receives image data acquired by the camera 100 from the image input unit 205 of the workstation 200 and stores it in the RAM 202.

Next, in S303, the CPU 201 reads out the image data from the RAM 202 and outputs it to the reasoning unit 206, and causes the reasoning unit 206 to reason (estimate or determine) the type of object and the position of the object on the image data. The reasoning unit 206 has a trained (learned) model created using machine learning such as deep learning, and outputs information about the type and position of an object such as a person as output data from image data as input data and a score indicating the reliability of the information. In this embodiment, the information about the position of the object is output as coordinates indicating the position of the center of gravity of the object within the image data. The CPU 201 stores information indicating the type and position of the object and the score in the RAM 202.

Next, in S304, the CPU 201 transmits a command to inquire about the current state of the camera 100 to the CPU 101 in the camera 100, and stores camera information, which is a response from the camera 100, in the RAM 202. The camera information includes information about driving the camera 100, such as the maximum, minimum, and current angles in panning and tilting, the maximum, minimum, and current angles of view (zoom values) in zooming, and the resolution and format of image data to be output contains information about an image.

Next, in S305, the CPU 201 calculates control amounts of the pan and tilt driving units for causing the camera 100 to track the object using the object position information stored in the RAM 202 in S303, the tracking sensitivity described below, and the camera information obtained from the camera 100 in S304. Then, the CPU 201 converts the control amount into a control command in accordance with a protocol previously determined as a method of controlling the camera 100 and written to the RAM 202. The control amount is a value that designates driving directions and driving speeds in pan driving and tilt driving of the camera 100, respectively. A procedure for calculating the control amount will be described below.

Next, in S306, the CPU 201 transmits the control command written to the RAM 202 in S305 to the camera 100. Then, the flow returns to S301.

On the other hand, the CPU 101 in the camera 100 starts processing upon receiving the control command transmitted by the workstation 200 in S306.

In S401, the CPU 101 reads the received control command and writes it to the RAM 102.

Next, in S402, the CPU 101 reads the driving direction and driving speed of the pan driving and tilt driving from the control command written into the RAM 102 in S401.

Next, in S403, the CPU 101 calculates driving parameters for pan driving and tilt driving based on the values read out in S402. The driving parameters are parameters for controlling the pan driving motor and the tilt driving motor included in the PTZ control unit 107. At this time, the received control command may be converted into a driving parameter using a conversion table previously stored in the RAM 102.

Next, in S404, the CPU 101 controls the PTZ control unit 107 based on the driving parameters calculated in S403. Thereby, the camera 100 is pan-driven and tilt-driven to change the imaging direction. Then, the CPU 101 ends this processing.

Calculation of Control Amount and Tracking Sensitivity

Figure 5:
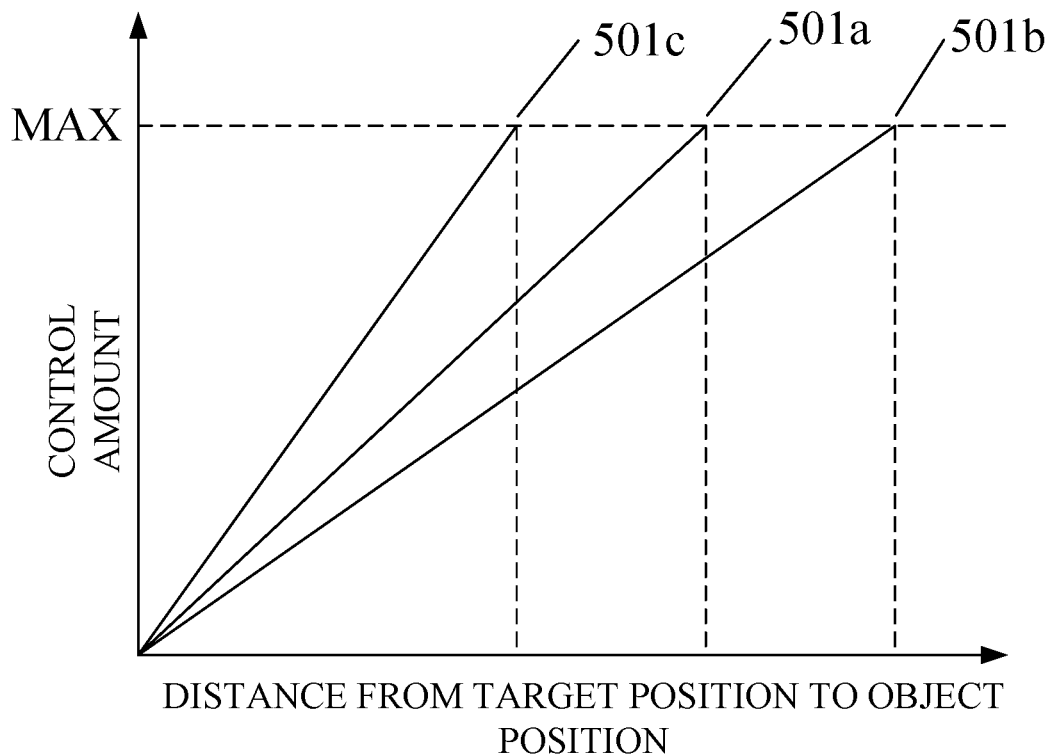
FIG. 5 explains tracking sensitivity and pan and tilt control amounts in the first embodiment.

A description will now be given of a method of calculating the control amount in S305 in FIG. 3. The CPU 201 in the workstation 200 controls the camera 100 so that the target position (such as the center) within the imaging angle of view approaches the object position. At this time, the CPU 201 calculates the control amount of the PTZ control unit 107 of the camera 100 required to bring the target position close to the object position. More specifically, as illustrated in FIG. 5, the control amount is calculated by multiplying a distance from the target position to the object position by a gain corresponding to the tracking sensitivity. The tracking sensitivity is a parameter relating to a control (change) speed of a direction of an imaging angle of view relative to object movement (change in object position), that is, a change in distance from the target position to the object position.

A control amount Yp is expressed by the following equation:

$$Yp=(Xh-Xt) \times K$$

where Xt is the target position, Xh is the object position, and K is a gain.

In a case where the gain K is set to a standard value, the control amount Yp changes with a change in distance as indicated by a straight line 501a in FIG. 5. In a case where a gain K smaller than the standard value is set, the control amount Yp mild changes with the change in distance as indicated by a straight line 501b. In a case where a gain K larger than the standard value is set, the control amount Yp gradually sharply changes with the change in distance as illustrated by a straight line 501c. Thus changing the gain K can adjust the control amount Yp.

Any method can be applied as long as it is a method of adjusting a control amount such that a sharp tracking operation is performed relative to object movement in a case where the tracking sensitivity is high, and a mild tracking operation is performed relative to object movement in a case where the tracking sensitivity is low.

A dead area may be set near the target position, in which pan driving control or tilt driving control is not performed even if the object position is detected. In this case, the size of the dead area may be reduced as a parameter in a case where the tracking sensitivity is high (that is, in a case where it is a preview camera or a standby camera as described below), and the size of the dead area may be increased in a case where the tracking sensitivity is low (that is, in a case where it is a streaming camera). A control amount proportional to the tracking sensitivity may be set for the PTZ control unit 107 regardless of a relationship between the target position and the object position. Moreover, a pan driving speed or a tilt driving speed may be decreased in a case where an absolute value of a difference between the target position and the object position is lower than a predetermined threshold, and a pan driving speed or a tilt driving speed may be increased in a case where the absolute value of the difference is higher than the predetermined threshold. In this case, the threshold may be changed according to the tracking sensitivity. That is, in a case where the tracking sensitivity is high, the threshold may be decreased, and in a case where the tracking sensitivity is low, the threshold may be increased. A combination of the above methods may also be used.

Camera Control Processing

Figure 6:
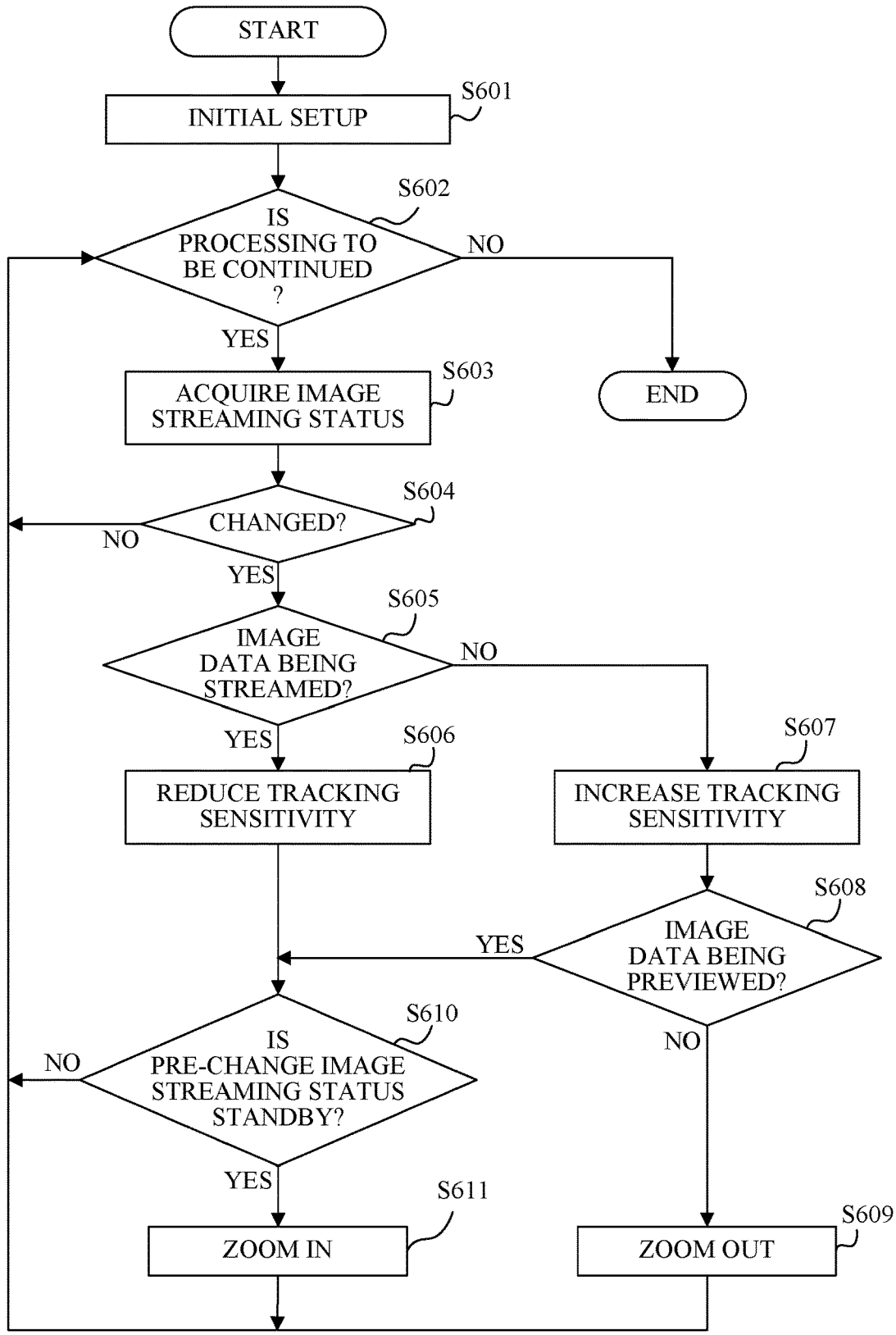
FIG. 6 is a flowchart illustrating the object tracking processing of the workstation.

A flowchart of FIG. 6 illustrates camera control processing (imaging control method) for changing a control parameter (referred to as a camera control parameter hereinafter) for the camera 100 to track an object according to the image streaming status, which is executed by the CPU 201 in the workstation 200 according to the control program.

In S601, the CPU 201 in the workstation 200 initially sets up a camera control parameter for tracking the object. More specifically, the tracking sensitivity of each of the streaming camera, preview camera, and standby camera, a zoom value at zoom-in (referred to as zoom-in value hereinafter), and a zoom value at zoom-out (referred to as zoom-out value hereinafter) are stored in the ROM 203, respectively, and stored in the RAM 202.

The tracking sensitivity of the streaming camera is lower than that of each of the preview camera and standby camera. The tracking sensitivity of the preview camera and the tracking sensitivity of the standby camera may be different from each other. For example, the tracking sensitivity of the preview camera may be made higher than the tracking sensitivity of the standby camera.

The zoom values of the streaming camera and the preview camera are the zoom-in values, and the zoom value of the standby camera is the zoom-out value. The zoom-in value is a zoom value on the telephoto side of the zoom-out value. In other words, the zoom-out value is a zoom value on the wide-angle side of the zoom-in value. The zoom-in values of the streaming camera and the preview camera may be different from each other. For example, the zoom-in value of the preview camera may be located on the wide-angle side of the zoom-in value of the streaming camera. The zoom-in value and zoom-out value can also be used in electronic zoom.

Parameter values input by the user via the user input I/F 207 may also be used as the initialized tracking sensitivity, zoom-in value, and zoom-out value.

In step S602, the CPU 201 confirms whether or not the CPU 201 has received an instruction for ending this processing via the communication unit 204 or the user input I/F 207 (whether or not the processing is to be continued). In a case where the CPU 201 has not yet received the instruction, the flow proceeds to step S603, and in a case where the CPU 201 has received the instruction, the flow ends.

In S603, the CPU 201 instructs the camera 100 to transmit streaming status information indicating the current image streaming status. The CPU 101 of each camera 100 that has received the instruction transmits the current streaming status information to the workstation 200. The CPU 201 stores the image streaming status indicated by the acquired current streaming status information in the RAM 202, and stores the already stored image streaming status in the RAM 202 as the last image streaming status. In this step, the CPU 201 may acquire the current streaming status information from the switcher 300 by instructing the switcher 300 (CPU 301) to transmit the current streaming status information.

Next, in S604, the CPU 201 compares the current image streaming status stored in the RAM 202 in S603 with the last image streaming status. In a case where they coincide with each other (in a case where there is no change in the image streaming status), the flow returns to S602, and in a case where they do not coincide with each other (in a case where the image streaming status has changed), the flow proceeds to S605.

In S605, the CPU 201 determines whether or not image data from any camera is being streamed (that is, whether any camera is a streaming camera) in the current image streaming status stored in the RAM 202 in S603. The flow proceeds to S606 for the streaming camera, and the flow proceeds to S607 for cameras other than the streaming camera.

In S606, the CPU 201 reads from the RAM 202 the tracking sensitivity of the streaming camera initially set up in S601, sets it as the tracking sensitivity (gain) for calculating the control amount in S305, and stores it in the RAM 202. The tracking sensitivity of the streaming camera set in this step is smaller than the tracking sensitivity of each of the preview camera and standby camera set in S607, which will be described below. This configuration is to prevent the image quality from deteriorating due to too fast tracking on the object movement during image streaming. Thereafter, the flow proceeds to S610.

On the other hand, in S607, the CPU 201 reads from the RAM 202 the tracking sensitivity of each of the preview camera and the standby camera initially set up in S601, sets it as the tracking sensitivity for calculating the control amount in S305, and stores it in the RAM 202. The tracking sensitivity set in this step is higher than the tracking sensitivity set in S606. This configuration is to allow the cameras other than the streaming camera to track the object movement at high speed. Thereafter, the flow proceeds to S608.

In S608, the CPU 201 determines whether or not the image data from any camera is being previewed in the current image streaming status stored in the RAM 202 in S603 (that is, whether any camera is a preview camera). The flow proceeds to S610 for the preview camera, and the flow proceeds to S609 for the standby camera other than the preview camera.

In S609, the CPU 201 reads the zoom-out value stored in the RAM 202 in S601 and transmits it to the standby camera to instruct it to change the zoom value. Upon receiving this instruction, the CPU 101 in the standby camera causes the imaging unit 104 to zoom to the received zoom-out value via the PTZ control unit 107. Thereby, the standby camera becomes less likely to lose the object. The zooming speed at this time may be faster than the zooming speed of the streaming camera. Thereafter, the flow returns to S602.

The standby camera may be zoomed out to a minimum zoom value (wide-angle end) without previously setting the zoom-out value. In this case, the CPU 201 in the workstation 200 instructs the CPU 101 in the standby camera to minimize the zoom value. The CPU 201 in the workstation 200 may determine the zoom value using the output data from the reasoning unit 206.

In S610, the CPU 201 in the workstation 200 determines whether or not the current streaming camera or preview camera was the last standby camera in the last image streaming status stored in the RAM 202 in S603. In a case where it is the last standby camera, the flow proceeds to S611; otherwise, the flow returns to S602.

In S611, the CPU 201 in the workstation 200 reads out the zoom-in value stored in the RAM 202 in S601, transmits it to the current streaming camera or preview camera that was the standby camera last time, and instructs it to change the zoom value. Upon receiving this instruction, the CPU 101 in the streaming camera or preview camera that was the standby camera last time causes the imaging unit 104 to zoom to the received zoom-in value via the PTZ control unit 107. This configuration can allow the streaming camera and the preview camera to capture a close-up image of the object. The zooming speed of the streaming camera at this time may be lower than the zooming speed of the standby camera. This configuration can suppress abrupt changes in the angle of view of the streamed image and provide an image that does not provide an uncomfortable sense. The zooming speed of the preview camera may be as fast as the zooming speed of the standby camera, or may be an intermediate zooming speed between the streaming camera and the standby camera.

In causing the streaming camera or preview camera to zoom in, it may be returned to the zoom value before it switches to the standby camera (in a case where it was the original streaming camera or preview camera) without previously setting the zoom-in value. In this case, before zooming out in S609, the CPU 201 in the workstation 200 inquires of the cameras 100 about the zoom value, and stores the zoom value as a response in the RAM 202. Then, in S611, the CPU 201 reads out the zoom value stored in the RAM 202 and transmits it to the current streaming camera or preview camera to instruct it to change the zoom value.

The CPU 201 in the workstation 200 may determine the zoom value using the output data from the reasoning unit 206. For example, the position information about the four corners of the object is obtained from the reasoning unit 206, the size of the object is calculated, and the zoom value is calculated so that the object has a predetermined size. The CPU 201 may then transmit the zoom value to the current streaming camera or preview camera to instruct it to change the zoom value.

According to the embodiment described above, the workstation 200 acquires the image streaming status of the camera 100, and changes the camera control parameters (such as tracking sensitivity and zoom value) according to the image streaming status. Thereby, the image streaming system that performs automatic tracking enables a viewer to view a high-quality image and can smoothly track the object. That is, this image streaming system can properly control the camera 100 that generates image data to be streamed.

While this embodiment uses three types of cameras, the streaming camera, the preview camera, and the standby camera, but may use two types of cameras, that is, the streaming camera and the standby camera. In this case, after S607 in FIG. 6, S609 is performed without S608.

Second Embodiment

A description will now be given of a second embodiment. In the first embodiment, the workstation 200 reasons the object position from the image data, and controls the camera 100 based on the reasoning result.

On the other hand, the camera 100 in this embodiment has a similar reasoning function and control function, thereby configuring an image streaming system that does not include a workstation. That is, the camera 100 includes an imaging control apparatus.

Figure 7:
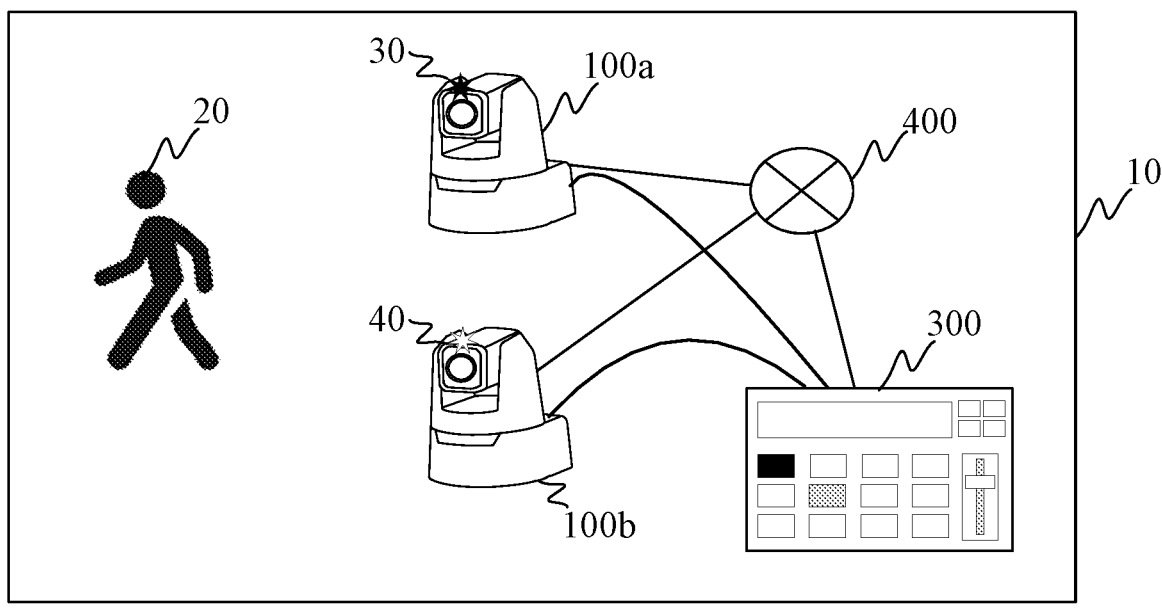
FIG. 7 illustrates an overview of an image streaming system according to a second embodiment.
Figure 8:
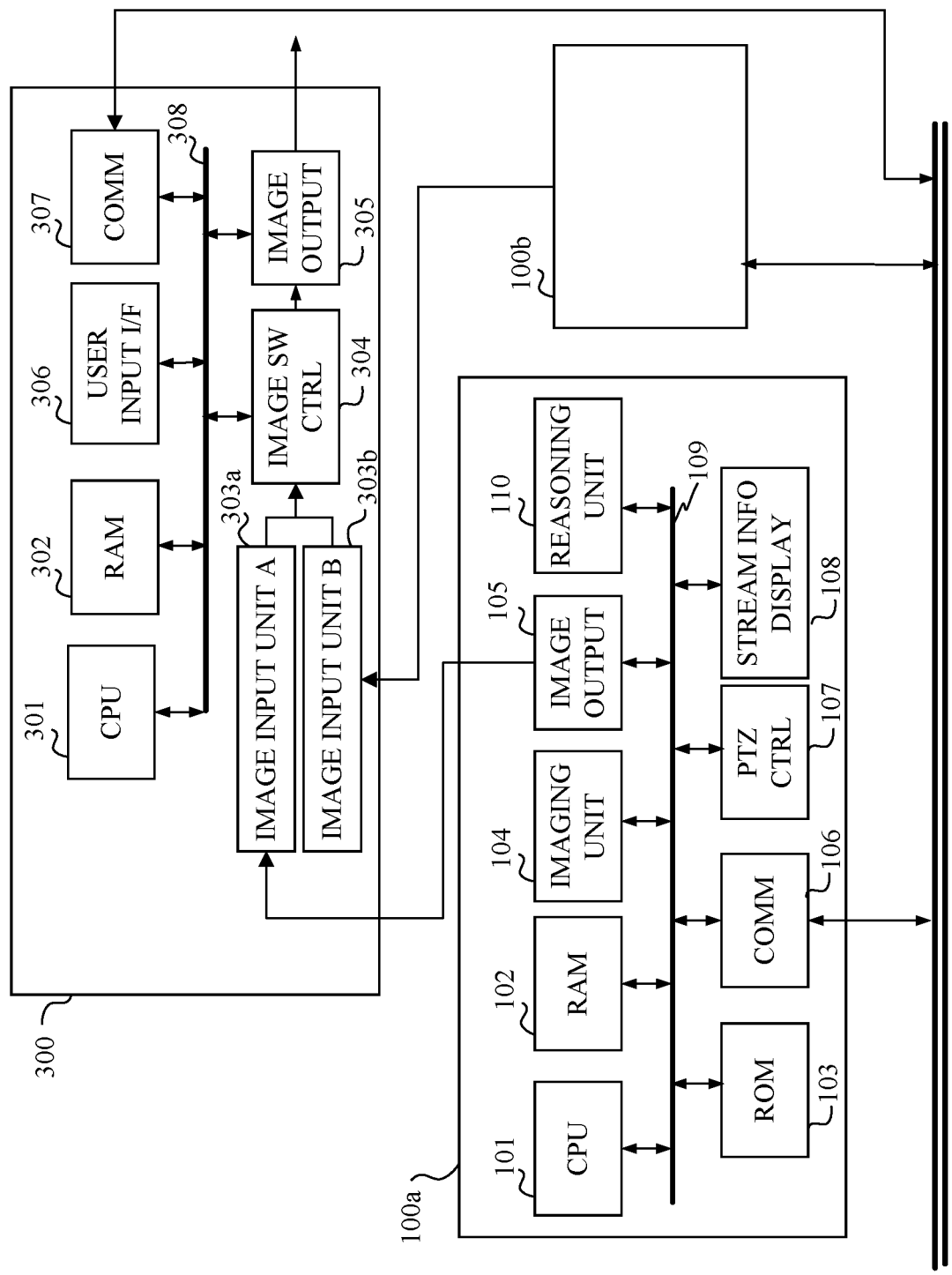
FIG. 8 is a block diagram illustrating a configuration of the image streaming system according to the second embodiment.

FIG. 7 illustrates an image streaming system according to this embodiment. FIG. 8 illustrates configurations of cameras 100 (100a, 100b) and a switcher 300 in the image streaming system according to this embodiment. The camera 100 includes a reasoning unit 110 in addition to the components illustrated in FIG. 2. The configuration of the switcher 300 is the same as the switcher 300 illustrated in FIG. 2. However, in this embodiment, the switcher 300 does not execute the processing illustrated in FIG. 6.

Figure 9:
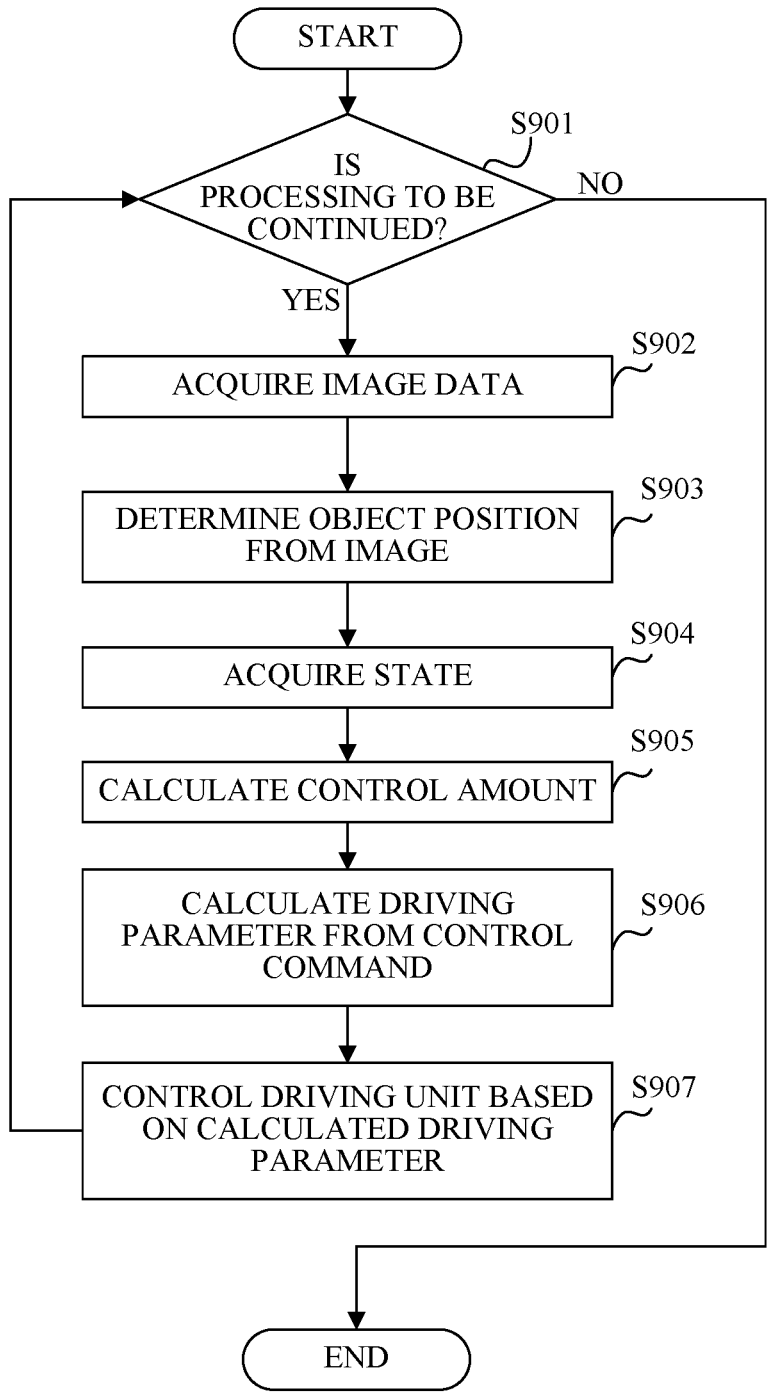
FIG. 9 is a flowchart illustrating object tracking processing of the camera according to the second embodiment.

FIG. 9 illustrates object tracking processing to be executed by the CPU 101 in the camera 100 according to the control program in this embodiment.

The CPU 101 starts processing illustrated in FIG. 9 by receiving an instruction indicating object tracking via the communication unit 106.

In S901, the CPU 101 confirms whether or not the CPU 101 has received an instruction for ending this processing via the communication unit 106 (whether or not the processing should be continued). In a case where the CPU 101 has not yet received this instruction, the flow proceeds to step S902, and in a case where the CPU 101 has received this instruction, the flow ends.

In S902, the CPU 101 stores image data acquired through imaging from the imaging unit 104 in the RAM 102.

Next, in S903, the CPU 101 reads image data from the RAM 202, outputs it to the reasoning unit 110, and causes the reasoning unit 110 to reason (estimate or determine) the type of object and the position of the object on the image data. Similarly to the reasoning unit 206 illustrated in FIG. 2, the reasoning unit 110 stores information about the type and position of an object such as a person as output data from image data as input data and a score indicating the reliability of the information in the RAM 102.

Next, in S904, the CPU 101 inquires of the PTZ control unit 107 about the driving state of the camera 100. The driving state of camera 100 includes maximum, minimum, and current angles for pan and tilt and maximum, minimum, and current zoom values for zoom. The CPU 101 also reads the setting states of the camera 100 such as the resolution and format of the image data from the RAM 102 and ROM 103.

Next, in S905, the CPU 101 calculates a control command (control amount) for tracking the object from the object position information and tracking sensitivity stored in the RAM 102 in S903 and the driving state of the camera 100 obtained in S904. A method of calculating the control amount is similar to that in S305 in FIG. 3.

Next, in S906, the CPU 101 calculates driving parameters for pan driving and tilt driving from the control command calculated in S905.

Then, in S907, the CPU 101 controls the PTZ control unit 107 based on the driving parameters calculated in S906. Thereby, the camera 100 is pan-driven and tilt-driven to change the imaging direction. Then, the CPU 101 returns to S901.

According to this embodiment, the camera 100 can be operated so as to track the object without a workstation.

This embodiment changes the camera control parameters for tracking the object according to the image streaming status of the camera 100 by performing through the CPU 101 in the camera 100 camera control processing similar to the processing illustrated in FIG. 6 in the first embodiment.

In S601, the CPU 101 initially sets up camera control parameters. More specifically, the CPU 101 reads out the tracking sensitivity, zoom-in value, and zoom-out value of each of the streaming camera, preview camera, and standby camera from ROM 103 and stored them in RAM 102. Parameter values input by the user via an unillustrated user input I/F provided to the camera 100 may be used as the initially set up tracking sensitivity, zoom-in value, and zoom-out value.

Next, in S602, the CPU 101 confirms whether or not the CPU 101 has received an instruction for ending this processing via the communication unit 106 (whether or not the processing is to be continued). In a case where the CPU 101 has not yet received the instruction, the flow proceeds to step S603, and in a case where the CPU 101 has received the instruction, the flow ends.

In S603, the CPU 101 reads out the current image streaming status and the last image streaming status stored in the RAM 102.

Next, in S604, the CPU 101 compares the current image streaming status read in S603 with the last image streaming status. In a case where they coincide with each other, the flow proceeds to S602, and in a case where they do not coincide with each other, the flow proceeds to S605.

In S605, the CPU 101 determines whether image data is being streamed from any camera in the current image streaming status read in S603 (that is, whether any camera is a streaming camera). The flow proceeds to S606 for the streaming camera, and to S607 for the cameras other than the streaming camera.

In S606, the CPU 101 reads from the RAM 102 the tracking sensitivity of the streaming camera initially set up in S601, sets it as the tracking sensitivity (gain) for calculating the control amount in S905, and stores it in the RAM 102. Thereafter, the flow proceeds to S610.

In S607, the CPU 101 reads out of the RAM 102 the tracking sensitivity of each of the preview camera and standby camera initially set up in S601, sets it as the tracking sensitivity for calculating the control amount in S905, and stores it in the RAM 102. Thereafter, the flow proceeds to S608.

In S608, the CPU 101 determines whether or not image data from any camera is being previewed in the current image streaming status stored in the RAM 102 in S603 (that is, whether any camera is a preview camera). For the preview camera, the flow proceeds to S610, and for the standby camera other than the preview camera, the flow proceeds to S609.

In S609, the CPU 101 in the standby camera reads out the zoom-out value stored in the RAM 102 in S601, and causes the imaging unit 104 via the PTZ control unit 107 to zoom to the received zoom-out value.

In S610, the CPU 101 determines whether or not the current streaming camera or preview camera was the last standby camera in the last image streaming status stored in the RAM 102 in S603. In a case where it is the last standby camera, the flow proceeds to S611; otherwise, the flow returns to S602.

In S611, the CPU 101 in the current streaming camera or preview camera that was the last standby camera reads out the zoom-in value stored in the RAM 102 in S601, and zooms to the zoom-in value received by the imaging unit 104 via the PTZ control unit 107.

Even if the camera 100 has an automatic tracking function (even without a workstation), this embodiment changes the camera control parameters according to the image streaming status. Thereby, an image streaming system that performs automatic tracking enables a viewer to view a high-quality image and can smoothly track the object.

Third Embodiment

A description will now be given of a third embodiment. This embodiment includes a controller 600 as an imaging control apparatus in place of the workstation 200 of the first embodiment. In the first and second embodiments, the workstation 200 or the camera 100 controls the camera 100 based on the object position reasoned from the image data. That is, this embodiment controls the camera 100 to automatically track the object without reasoning the object position from the image data.

Figure 10:
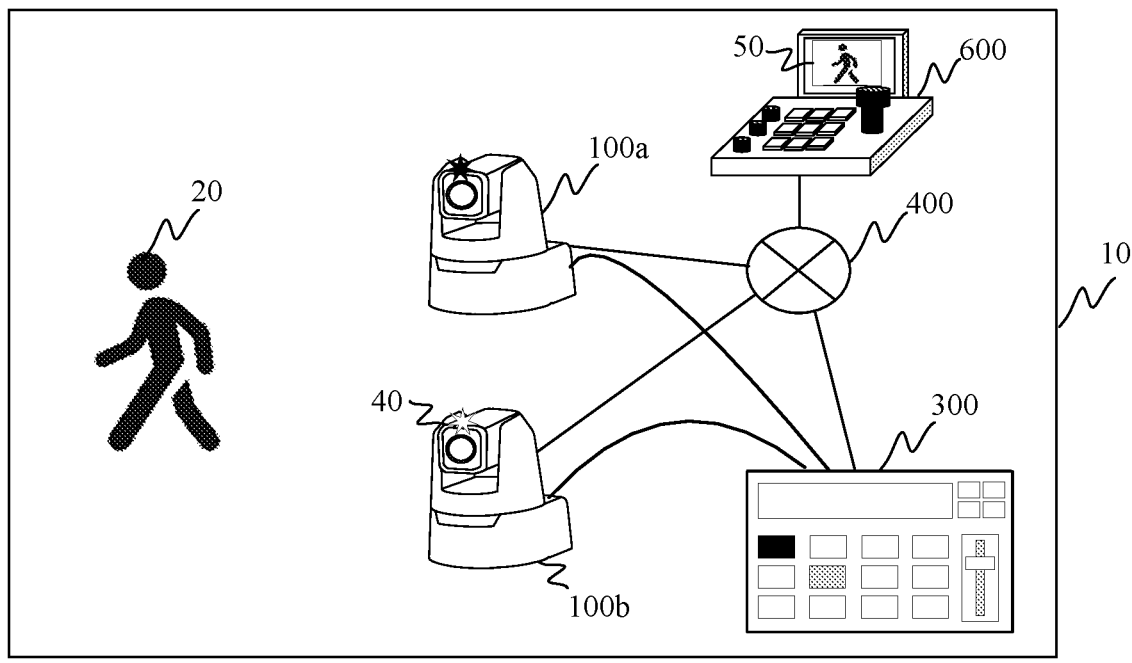
FIG. 10 illustrates an overview of an image streaming system according to a third embodiment.

In a case where the user controls the camera 100 through the controller 600, the user causes an image 50 acquired by the camera 100 to be displayed on the controller 600 (or an unillustrated monitor) as illustrated in FIG. 10 so that the user can operate the controller 600 while viewing the image 50. The image 50 at this time is a streamed image or preview image from the streaming camera or preview camera selected by the switcher 300.

Thereafter, in a case where the standby camera is switched to the streaming camera or the preview camera in the switcher 300 and the zoom value of the standby camera is set to the telephoto side, an object 20 is likely to disappear from the image 50 and get lost and it may take a long time to re-capture the object 20. Even in such a case, this embodiment can stream a high-quality image that viewers can view while the object becomes less likely to get lost.

The camera 100, switcher 300, and controller 600 can communicate with each other via the network 400. They may be connected via a communication cable.

The controller 600 transmits to the cameras 100 an image request command requesting each camera 100 for transmission of an image stream via the network 400 (or the communication cable) and a setting command instructing it to set various parameters to the camera 100, and controls the operation of each camera 100. Each camera 100 transmits an image stream to the controller 600 via the image cable (or network 400) according to the image request command, and stores various parameters according to the setting command. The controller 600 controls the orientation and size of the imaging angle of view of each camera 100 in the pan and tilt directions by transmitting commands for controlling pan, tilt, and zoom to each camera 100.

Figure 11:
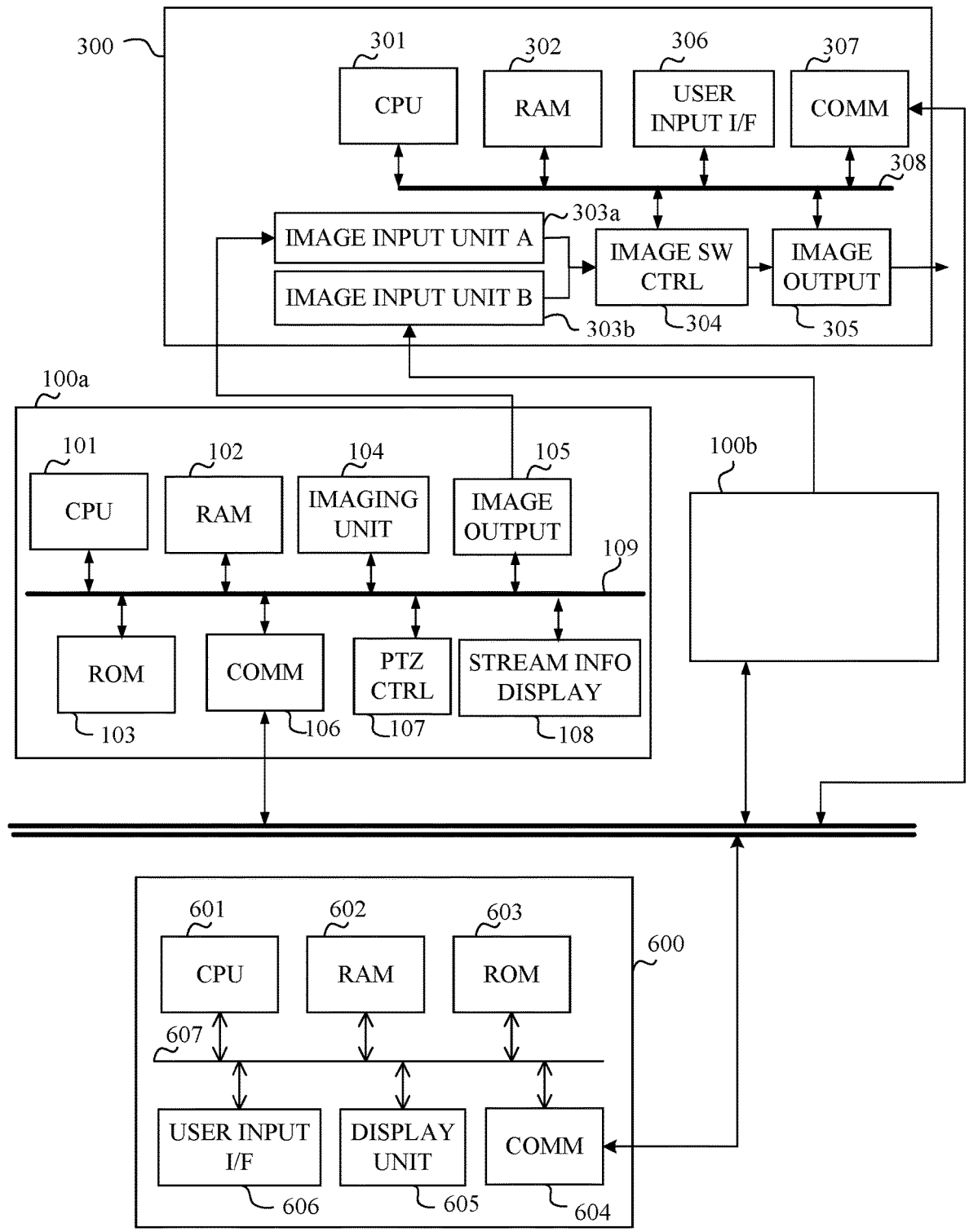
FIG. 11 is a block diagram illustrating the configuration of the image streaming system according to the third embodiment.

FIG. 11 illustrates configurations of the camera 100, switcher 300, and controller 600 in the image streaming system according to this embodiment. The configurations of the camera 100 and the switcher 300 are similar to those of the first embodiment.

The controller 600 includes a CPU 601, a RAM 602, a ROM 603, a communication unit 604, a display unit 605, and a user input I/F 606, which are interconnected via an internal bus 607.

The CPU 601 controls the overall operation of the controller 600. The RAM 602 as a work memory temporarily stores control programs and data. The ROM 603 is a nonvolatile memory represented by a flash memory or the like, and is used as a permanent memory area for the OS, various programs, and various data. The ROM 603 is also used as a short-term memory area for various data.

The communication unit 604 performs network communication with external devices. In this embodiment, the communication unit 604 communicates with the cameras 100. The display unit 605 includes a liquid crystal panel, an organic EL panel, or the like, and displays image data acquired from the camera 100 and a setting screen for the controller 600.

The user input I/F 606 is connected to input devices such as a button, a dial, a joystick, and a touch panel provided on the controller 600, and transmits an instruction corresponding to an operation of the user on the input device to the CPU 601. This configuration can select a camera that transmits a control command according to the operation of the user on the input device, and information about the selection of the camera that transmits the control command is stored in the RAM 602.

Figure 12:
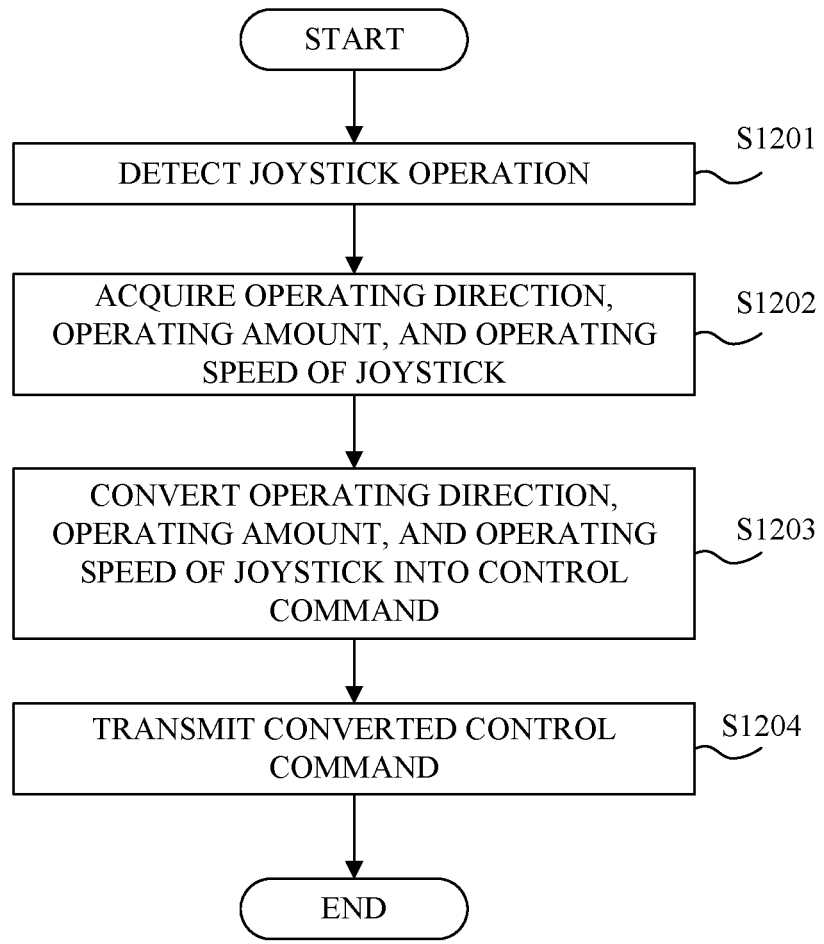
FIG. 12 is a flowchart illustrating object tracking processing of a controller according to the third embodiment.

A flowchart in FIG. 12 illustrates camera control processing executed by the CPU 601 in the controller 600 according to a control program. This embodiment controls the camera 100 based on a control command transmitted from the controller 600, but the processing performed by the camera 100 is similar to that illustrated in FIG. 4, so a description thereof will be omitted.

The CPU 601 in the controller 600 starts this processing by detecting an operation on the input device (here, a joystick) of the controller 600 via the user input I/F 606.

At S1201, the CPU 601 reads the joystick operation of the user.

Next, in S1202, the CPU 601 acquires an operating direction and an operating amount of the joystick. An illustrative joystick is one that outputs analog voltage from a variable resistor provided in each of the pan and tilt directions. The CPU 601 acquires the operating direction and the operating amount by reading a digital value obtained by A/D-converting the analog voltage output from the joystick. The CPU 601 can acquire a change speed of the digital value within a predetermined range such as 0 to 1023 in each of the pan direction and the tilt direction as a joystick operating speed (angular speed).

Next, in S1203, the CPU 601 converts the operating direction, operating amount, and operating speed of the joystick into a control command according to a predetermined protocol, and writes it into the RAM 602.

Next, in S1204, the CPU 601 reads out of the RAM 602 in S1203 the control command and information about the selection of the camera that transmits the control command. The CPU 601 then transmits the control command to the selected camera 100 via the communication unit 604.

The above processing can control the pan driving and tilt driving of the camera 100 according to the operation of the user on the controller 600.

Figure 13:
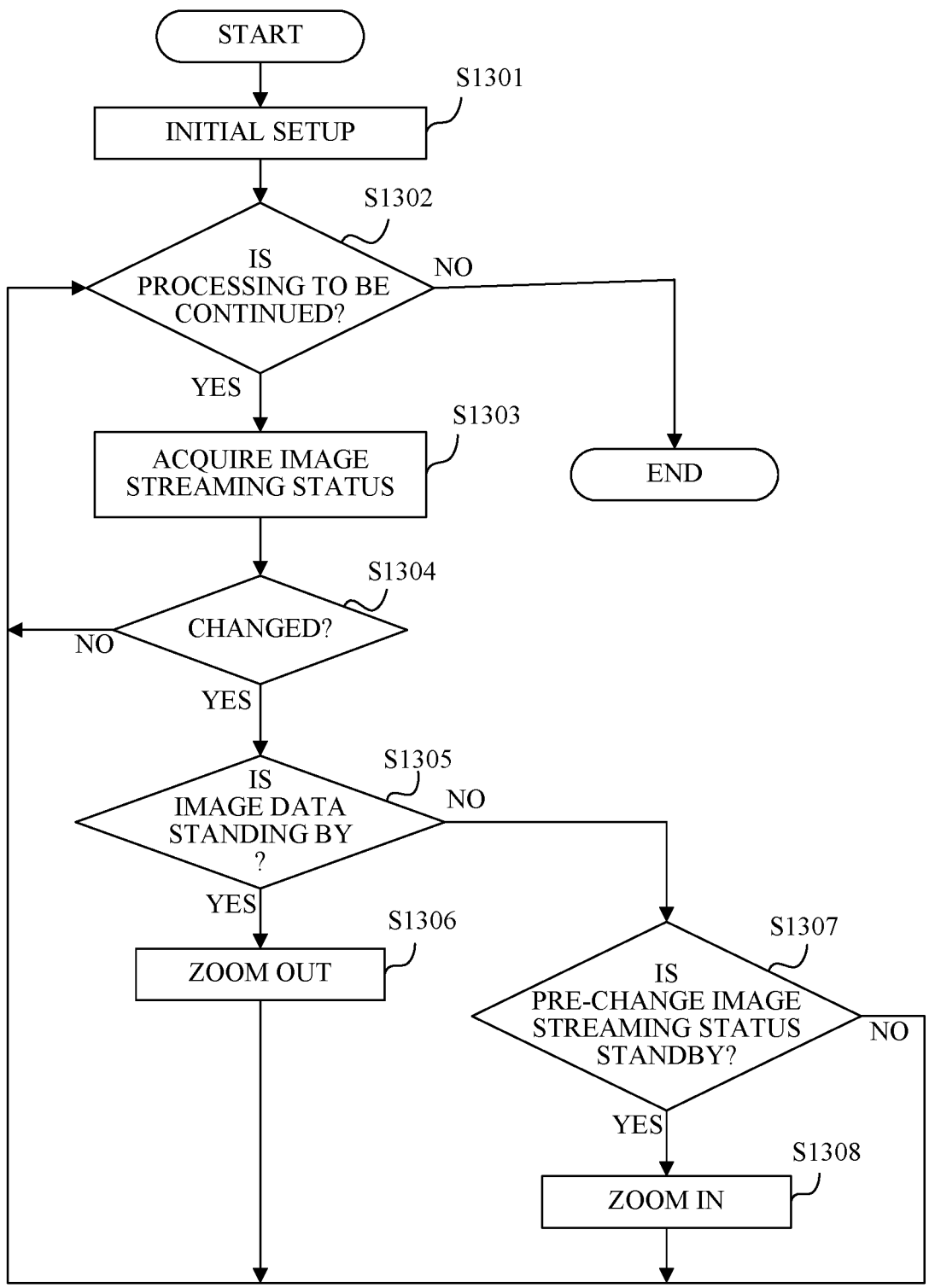
FIG. 13 is a flowchart illustrating object tracking processing of the camera according to the third embodiment.

A flowchart in FIG. 13 illustrates camera control processing (imaging control method) for changing camera control parameters for the cameras 100 to track the object according to the image streaming status, which is to be executed by the CPU 601 in the controller 600 according to the control program.

In S1301, the CPU 601 initially sets up camera control parameters. More specifically, the CPU 601 reads the zoom-in value and the zoom-out value out of the ROM 603 and stores them into the RAM 602. Parameter values input by the user through the input device connected to the user input I/F 606 may be used as the initially set up zoom-in value and zoom-out value.

Next, in S1302, the CPU 601 confirms whether or not the CPU 601 has received an instruction for ending this processing via the communication unit 604 or the user input I/F 606 (whether or not the processing is to be continued). In a case where the CPU 601 has not yet received this instruction, the flow proceeds to step S1303, and in a case where the CPU 601 has received this instruction, the flow ends.

In S1303, the CPU 601 instructs the camera 100 to transmit the current image streaming status (streaming status information). Upon receiving this instruction, the CPU 101 in the camera 100 transmits the current image streaming status to the controller 600. The CPU 601 in the controller 600 that has received the current image streaming status stores it in the RAM 602. The CPU 601 also stores the already stored image streaming status in the RAM 602 as the last image streaming status.

Next, in S1304, the CPU 601 compares the current image streaming status stored in the RAM 602 in S1303 with the last image streaming status. In a case where they coincide with each other (in a case where there is no change in the image streaming status), the flow proceeds to S1302, and in a case where they do not coincide with each other (the image streaming status has changed), the flow proceeds to S1305.

In S1305, the CPU 601 determines whether or not image data from any camera is standing by in the current image streaming status stored in the RAM 602 in S1303 (that is, whether any camera is a standby camera). The flow proceeds to S1306 for the standby camera, and the flow proceeds to S1307 for the streaming camera and the preview camera other than the standby camera.

In S1306, the CPU 601 reads the zoom-out value stored in the RAM 602 in S1301 and transmits it to the standby camera to instruct it to change the zoom value. Upon receiving this instruction, the CPU 101 in the standby camera causes the imaging unit 104 to zoom to the received zoom-out value via the PTZ control unit 107. Thereby, the standby camera is less likely to lose the object. Thereafter, the flow returns to S1302.

Even in this embodiment, the standby camera may be zoomed out to a minimum zoom value without previously setting the zoom-out value. In this case, the CPU 601 instructs the CPU 101 in the standby camera to minimize the zoom value.

In S1307, the CPU 601 in the controller 600 determines whether or not the current streaming camera or preview camera was the last standby camera in the last image streaming status stored in the RAM 602 in S1303. In a case where it was the last standby camera, the flow proceeds to S1308; otherwise, the flow returns to S1302.

In S1308, the CPU 601 reads out the zoom-in value stored in the RAM 602 in S1301, transmits it to the current streaming camera or preview camera, which was the standby camera last time, and instructs it to change the zoom value. Upon receiving this instruction, the CPU 101 in the streaming camera or preview camera that was the standby camera last time causes the imaging unit 104 to zoom to the received zoom-in value via the PTZ control unit 107. This configuration enables the streaming camera or the preview camera to capture a close-up image of the object. Thereafter, the flow returns to S1302.

In causing the streaming camera or preview camera to zoom in, it may be returned to the zoom value before it switches to the standby camera (in a case where it was the original streaming camera or preview camera) without previously setting the zoom-in value. In this case, before zooming out in S1306, the CPU 601 inquires of the camera 100 about the zoom value, and stores the zoom value as a response in the RAM 602. Then, in S1308, the CPU 601 reads out the zoom value stored in the RAM 602 and transmits it to the current streaming camera or preview camera to instruct to change the zoom value.

In this embodiment, the controller 600 acquires the image streaming status of each camera 100 and controls each camera 100 based on the acquired image streaming status, but each camera 100 may read out its own image streaming status and control itself. In this case, the CPU 101 in each camera 100 reads out the tracking sensitivity, zoom-in value, zoom-out value, current and last image streaming statuses of each of the streaming camera, preview camera, and standby camera stored in the RAM 102, and performs S1303 to S1308.

In a case where the camera 100 is controlled according to the operation of the user on the controller 600, this embodiment enables a viewer to view a high-quality image, and can smoothly track the object.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of streamed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-137841, filed on Aug. 31, 2022, which is hereby incorporated by reference herein in its entirety.

What is claimed is:

1. An imaging control apparatus comprising:
a memory storing instructions; and
a processor configured to execute the instructions to:
acquire a streaming status of image data generated by an image pickup apparatus;
detect an object from the image data;
control an imaging direction of the image pickup apparatus according to the detected position of the object by changing a parameter for controlling the imaging direction according to the streaming status; and wherein the processor is configured to set a dead area in which the imaging direction is not controlled relative to movement of the object, and wherein the parameter is a size of the dead area.

2. The imaging control apparatus according to claim 1, wherein there are a plurality of image pickup apparatuses, and wherein the processor is configured to:

acquire the streaming status of each of a plurality of image data generated by the plurality of image pickup apparatus, and change a zoom value of each of the plurality of image pickup apparatuses according to the streaming status.

3. The imaging control apparatus according to claim 1, wherein the streaming status includes a streaming state in which the image data is being streamed and a standby state in which streaming of the image data stands by, and wherein the processor is configured to set a zoom value for the standby state on a wide-angle side of the zoom value for the streaming state.

4. The imaging control apparatus according to claim 1, wherein the streaming status includes a streaming state in which the image data is being streamed and a standby state in which streaming of the image data stands by, wherein the memory stores a zoom value for the streaming state in a case where the streaming state changes to the standby state, and wherein the processor is configured to change the zoom value to a stored zoom value in a case where the standby state changes to the streaming state.

5. The imaging control apparatus according to claim 1, wherein the streaming status includes a streaming state in which the image data is being streamed, a standby state in which streaming of the image data stands by, and a preview state that can become the streaming state before the standby state, and wherein the processor is configured to set a zoom value to a wider-angle side than the preview state in the standby state.

6. The imaging control apparatus according to claim 1, wherein the streaming status includes a streaming state in which the image data is being streamed and a standby state in which streaming of the image data stands by, and wherein the processor is configured to make a zooming speed in the streaming state slower than that in the standby state.

7. The imaging control apparatus according to claim 1, wherein the processor is configured to:

detect an object from the image data, control an imaging direction of the image pickup apparatus according to a detected position of the object, and change a parameter for controlling the imaging direction according to the streaming status.

8. The imaging control apparatus according to claim 7, wherein the parameter is sensitivity relating to a control speed in the imaging direction relative to a change in a position of the object.

9. The imaging control apparatus according to claim 1, wherein the parameter is sensitivity relating to a control speed in the imaging direction relative to a change in a position of the object.

10. The imaging control apparatus according to claim 9, wherein the streaming status includes a streaming state in which the image data is being streamed and a standby state in which streaming of the image data stands by, and wherein the processor is configured to set the sensitivity so that the control speed in the streaming state is lower than the control speed in the standby state.

11. The imaging control apparatus according to claim 9, wherein the streaming status includes a streaming state in which the image data is being streamed, a standby state in which streaming of the image data stands by, and a preview state that can become the streaming state before the standby state, and wherein the processor is configured to change the sensitivity between the streaming state and the preview state.

12. The imaging control apparatus according to claim 11, wherein the processor is configured to set the sensitivity so that the control speed in the streaming state is lower than the control speed in the preview state.

13. The imaging control apparatus according to claim 1, wherein the streaming status includes a streaming state in which the image data is being streamed and a standby state in which streaming of the image data stands by, and wherein the processor is configured to make the size of the dead area in the streaming state larger than the size of the dead area in the standby state.

14. An imaging control method comprising:

acquiring a streaming status of image data generated by an image pickup apparatus;

detecting an object from the image data;

controlling an imaging direction of the image pickup apparatus according to a detected position of the object by changing a parameter for controlling the imaging direction according to the streaming status in the step of controlling the imaging direction; and setting a dead area in which the imaging direction is not controlled relative to movement of the object, wherein the parameter is a size of the dead area.

15. A non-transitory computer-readable storage medium storing a program that causes a computer to execute an imaging control method comprising:

acquiring a streaming status of image data generated by an image pickup apparatus;

detecting an object from the image data;

controlling an imaging direction of the image pickup apparatus according to a detected position of the object by changing a parameter for controlling the imaging direction according to the streaming status in the step of controlling the imaging direction; and setting a dead area in which the imaging direction is not controlled relative to movement of the object, wherein the parameter is a size of the dead area.

* * * * *